US011937358B1

(12) United States Patent
Okuda et al.

(10) Patent No.: US 11,937,358 B1
(45) Date of Patent: Mar. 19, 2024

(54) ENGINE

(71) Applicant: TOYOTA JIDOSHA KABUSHIKI KAISHA, Toyota (JP)

(72) Inventors: Tadashi Okuda, Hadano (JP); Shunsuke Fushiki, Susono (JP); Susumu Hashimoto, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/465,599

(22) Filed: Sep. 12, 2023

(30) Foreign Application Priority Data

Nov. 14, 2022 (JP) ................................ 2022-181710

(51) Int. Cl.
*H05B 6/10* (2006.01)
*F02F 1/00* (2006.01)
*H05B 6/36* (2006.01)

(52) U.S. Cl.
CPC ............... *H05B 6/10* (2013.01); *F02F 1/004* (2013.01); *H05B 6/362* (2013.01)

(58) Field of Classification Search
CPC ............ H05B 6/10; H05B 6/362; F02F 1/004
See application file for complete search history.

(56) References Cited

U.S. PATENT DOCUMENTS 3,336,746 A * 8/1967 Southwick .............. F01K 21/02 123/25 B
6,688,263 B1 2/2004 Yamamoto et al.
10,508,615 B2 * 12/2019 Polonowski .......... F02D 35/025
2008/0284263 A1 * 11/2008 Dessirier ................ H02K 5/203 310/54
2016/0010533 A1 * 1/2016 Matsumoto ............... F02F 1/14 123/41.08
2019/0239294 A1 * 8/2019 Okazaki ................... H05B 6/02

FOREIGN PATENT DOCUMENTS

JP 2001-152960 A 6/2001
JP 2022-054789 A 4/2022

* cited by examiner

*Primary Examiner* — Grant Moubry
*Assistant Examiner* — James G Moubry
(74) *Attorney, Agent, or Firm* — Oblon, McClelland, Maier & Neustadt, L.L.P.

(57) ABSTRACT

An engine includes a cylinder block including a cylinder wall, a cylinder liner, and a water jacket. The engine further includes a heater including an induction coil disposed in the water jacket. The heater is configured to heat the cylinder wall by generating an eddy current in the cylinder wall by an alternating current flowing through the induction coil.

4 Claims, 3 Drawing Sheets

ENGINE

BACKGROUND

1. Field

The present disclosure relates to an engine.

2. Description of Related Art

An engine described in Japanese Laid-Open Patent Application No. 2001-152960 includes a cylinder block having a gas jacket. The gas jacket extends along a cylinder wall in the cylinder block. An exhaust passage is connected to the gas jacket via an exhaust gas supply valve. The gas jacket is connected to an intake passage via an exhaust gas discharge passage.

When the exhaust gas supply valve is open during operation of the engine, the exhaust gas flows through the gas jacket. This allows the cylinder wall to be heated. Through the heating of the cylinder wall, a cylinder liner located inside the cylinder wall is heated. Thus, the temperature of lubricating oil between the cylinder liner and the piston can be raised to a desired temperature. As a result, the viscosity of the lubricating oil is reduced, so that the friction loss between the cylinder liner and the piston is suppressed. Thus, the fuel efficiency is improved.

Immediately after the engine is started, fuel sprayed from an injector and not vaporized may collect on the cylinder liner. If the air-fuel mixture is ignited in a state in which the fuel is not sufficiently vaporized, particulate matter (PM) may be generated. When the cylinder liner is heated, the fuel can be sufficiently vaporized to suppress the generation of PM.

In the technique described in the above publication, the cylinder liner is heated when the temperature of the exhaust gas is sufficiently high. Immediately after the engine is started, however, the temperature of the exhaust gas is low. Therefore, it is difficult to suppress the generation of PM immediately after the engine is started.

SUMMARY

In one aspect of the present disclosure, an engine includes: a cylinder block including a cylinder wall, a cylinder liner located inside the cylinder wall and continuous with the cylinder wall, and a water jacket extending along the cylinder wall; and a heater including an induction coil. The induction coil is disposed in the water jacket and extends along the cylinder wall. The heater is configured to heat the cylinder wall by generating an eddy current in the cylinder wall by an alternating current flowing through the induction coil.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

Hereinafter, an engine according to a first embodiment will be described with reference to the drawings.

<Outline of Engine 100>

Figure 1:
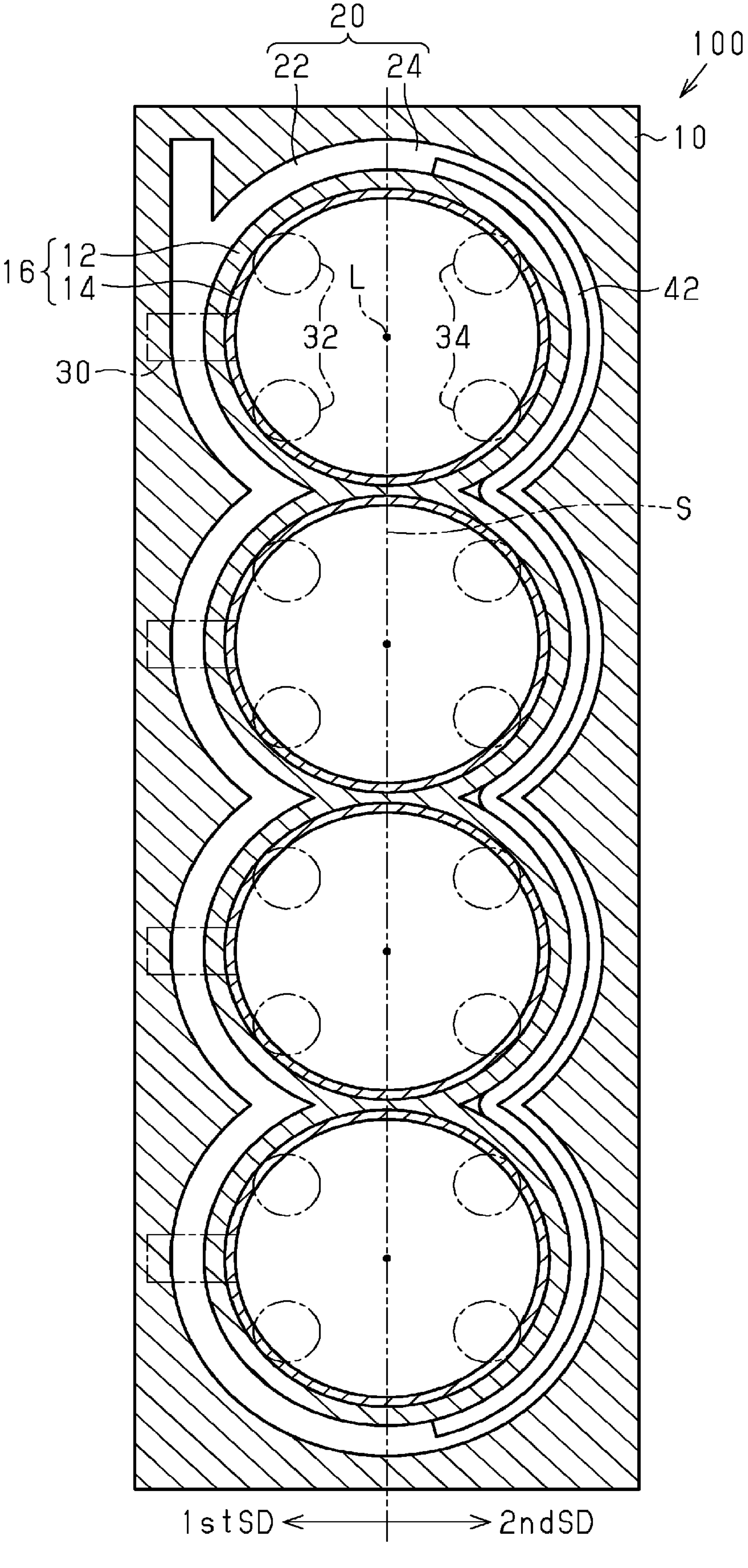
FIG. 1 is a cross-sectional view of a cylinder block provided in an engine according to a first embodiment.

As shown in FIG. 1, an engine 100 includes a cylinder block 10. The cylinder block 10 includes cylinders 16. Each of the cylinders 16 includes a cylinder wall 12 and a cylinder liner 14 located inside the cylinder wall 12 and continuous with the cylinder wall 12. That is, the cylinder wall 12 and the cylinder liner 14 constitute the cylinder 16. The cylinder liner 14 is entirely made of an iron material. The cylinder block 10 is made of an aluminum material except for the cylinder liners 14.

Figure 2:
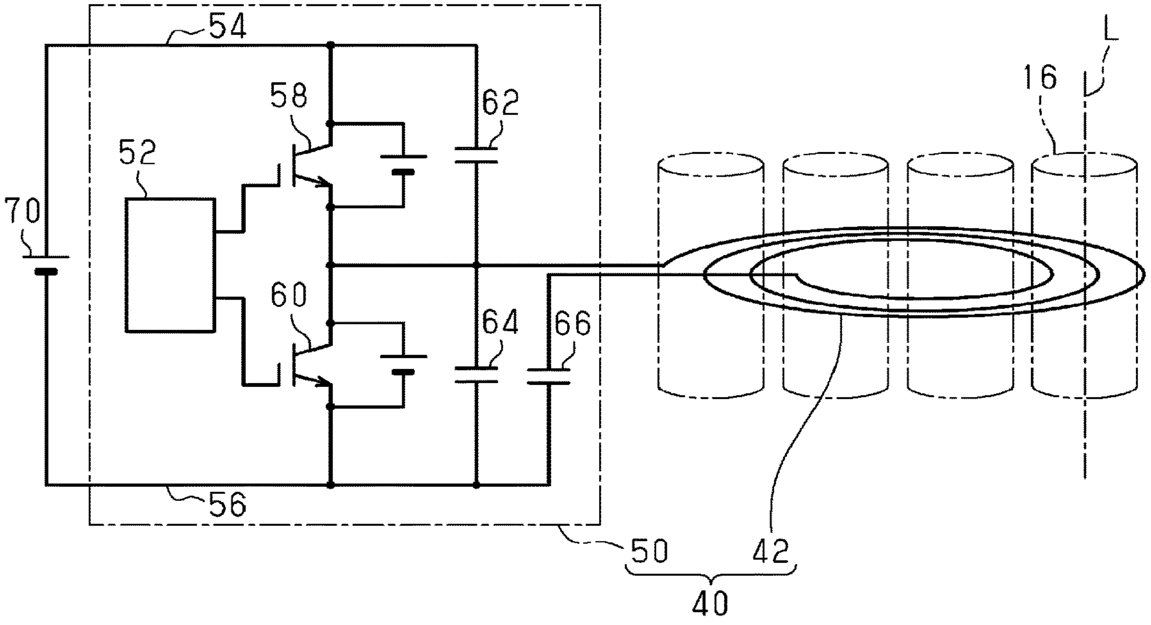
FIG. 2 is a diagram for explaining a heater provided in the engine of FIG. 1.

A water jacket 20 extends along the cylinder walls 12 in the cylinder block 10. The engine 100 includes a heater 40 having an induction coil 42 extending along the cylinder walls 12. The induction coil 42 has a sheet shape. The induction coil 42 is fixed to the cylinder walls 12. As shown in FIG. 2, the heater 40 includes the induction coil 42 and a drive circuit 50. Details of the drive circuit 50 will be described later. As shown in FIG. 1, the induction coil 42 is disposed in the water jacket 20. The heater 40 heats the cylinder walls 12 by generating an eddy current in the cylinder walls 12 by an alternating current flowing through the induction coil 42.

As shown in FIG. 1, the engine 100 includes injectors 30 configured to inject fuel into the cylinders 16, respectively. Two intake valves 32 and two exhaust valves 34 are provided in the engine 100 for each of the cylinders 16. In FIG. 1, the injectors 30, the intake valves 32 and the exhaust valves 34 are represented by the long-dash short-dash lines.

<Positional Relationship Between Injectors 30 and Induction Coil 42>

As shown in FIG. 1, the cylinders 16 are arranged in a row, and central axes L of the cylinders 16 are on one cross section S of the cylinder block 10. The water jacket 20 includes a first flow path 22 positioned at a first side 1stSD with respect to the cross section S and a second flow path 24 positioned at a second side 2ndSD with respect to the cross section S. The first side 1stSD and the second side 2ndSD are opposite to each other with respect to the cross section S. Each of the first flow path 22 and the second flow path 24 extends over the cylinders 16. The induction coil 42 is disposed in the second flow path 24. Each of the injectors 30 is directed toward the second side 2ndSD. Each of the plurality of injectors 30 is arranged to inject fuel in a direction from the first side 1stSD toward the second side 2ndSD.

<Driving Circuit 50 of Heater 40>

The driving circuit 50 of the heater 40 will be described with reference to FIG. 2. As described above, the heater 40 includes the induction coil 42 and the drive circuit 50. A DC power supply 70 supplies voltage to the drive circuit 50.

The drive circuit 50 has a positive electrode line 54 connected to a high potential terminal of the DC power supply 70. The drive circuit 50 has a negative electrode line 56 connected to a low potential terminal of the DC power supply 70. The drive circuit 50 includes an upper arm switch 58 connected to the positive electrode line 54. The drive circuit 50 includes a lower arm switch 60 connected to the negative electrode line 56. The upper arm switch 58 and the lower arm switch 60 are connected to each other. The output controller 52 can individually turn on and off the upper arm switch 58 and the lower arm switch 60.

The drive circuit 50 includes a first snubber capacitor 62 connected to the positive electrode line 54. The driving circuit 50 includes a second snubber capacitor 64 connected to the negative electrode line 56. The first snubber capacitor 62 and the second snubber capacitor 64 are connected to each other. The drive circuit 50 has a resonant capacitor 66 connected to the negative line 56. By changing the capacitance of the resonant capacitor 66, it is possible to change the resonant frequency of the circuit. By reducing the capacitance of the resonant capacitor 66, it is possible to increase the resonant frequency of the circuit. This allows the resonant frequency of the circuit to be matched to the frequency of the alternating magnetic field desired for heating the cylinder walls 12.

An intermediate point between the upper arm switch 58 and the lower arm switch 60 is connected to a first end of the induction coil 42. An intermediate point between the first snubber capacitor 62 and the second snubber capacitor 64 is connected to the first end of the induction coil 42. A second end of the induction coil 42 is connected to the negative line 56 via a resonant capacitor 66.

By keeping the upper arm switch 58 in an ON state and keeping the lower arm switch 60 in an OFF state, a current flows through the induction coil 42 in one direction. Thereafter, by keeping the upper arm switch 58 in an OFF state and keeping the lower arm switch 60 in an ON state, a current flows through the induction coil 42 in the reverse direction. This is because the charge stored in the resonant capacitor 66 flows out by maintaining the upper arm switch 58 in an ON state and maintaining the lower arm switch 60 in an OFF state.

<Magnetic Field Generated by Induction Coil 42>

Figure 3:
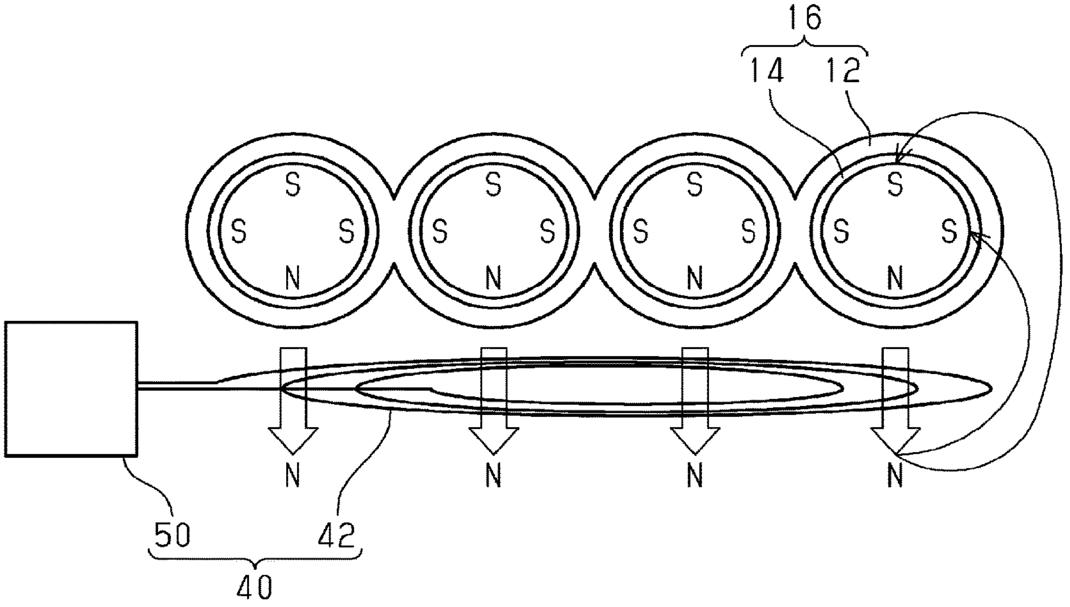
FIG. 3 is a diagram for explaining a magnetic field generated by an induction coil provided in the engine of FIG. 1.

The magnetic field generated by the induction coil 42 will be described with reference to FIG. 3. One spiral of the induction coil 42 extends over the multiple cylinders 16. Therefore, when an alternating current is applied to the induction coil 42, the same polarity appears at portions of the cylinders 16 facing the induction coil 42. In FIG. 3, north poles appear at the portions of the cylinders 16 facing the induction coil 42. South poles appear at portions of the cylinders 16 opposite to the induction coil 42. As indicated by arrows in FIG. 3, lines of magnetic force are generated so as to wrap around the cylinders 16.

<Advantages of First Embodiment>

(1-1) According to the present embodiment, the cylinder walls 12 is heated by generating an eddy current in the cylinder walls 12 using the induction coil 42, regardless of whether or not the engine 100 has just started. Thus, the cylinder liners 14 is heated. Thus, the fuel collecting on the cylinder liners 14 is sufficiently vaporized, so that the generation of PM is suppressed even immediately after the start of the engine 100.

(1-2) Unlike the present embodiment, in a comparative example, the cylinder block 10 includes a heater 40 having a resistance heating element extending along the cylinder walls 12. In the comparative example, it is necessary to bring the resistance heating element into close contact with the cylinder walls 12 from the viewpoint of ensuring the effectiveness of heating the cylinder walls 12. However, it is difficult to bring the resistance heating element into close contact with the cylinder walls 12. This difficulty is caused by the fact that the cylinder wall 12 is cast and therefore has a large number of irregularities. In contrast, in the present embodiment, the cylinder block 10 includes the heater 40 having the induction coil 42 extending along the cylinder walls 12. Even if the induction coil 42 is not brought into close contact with the cylinder walls 12, a sufficient eddy current is generated in the cylinder walls 12. Therefore, the induction coil 42 does not need to be in close contact with the cylinder walls 12. Therefore, the engine 100 of the present embodiment is easier to manufacture than the comparative example.

(1-3) In the comparative example in which the heater 40 includes the resistance heating element, it is necessary to transfer heat from the resistance heating element to the cylinder walls 12. In contrast, in the above embodiment, the cylinder walls 12 themselves are heated. This means that heat transfer from the resistance heating element to the cylinder walls 12 is not required, so that the temperature raising efficiency is excellent.

(1-4) In the comparative example in which the heater 40 includes the resistance heating element, regions of the cylinder walls 12 that are difficult to be heated are likely to be generated due to the absence of a wire between wires of the resistance heating element. In contrast, in the above embodiment, since the induction coil 42 generates an eddy current in the cylinder walls 12, a wide region of the cylinder walls 12 is easily heated.

(1-5) In the present embodiment, the induction coil 42 is disposed in the second flow path 24. Each of the injectors 30 is directed toward the second side 2ndSD. Therefore, it is easy to heat portions of the cylinder liners 14 to which fuel is likely to adhere. Therefore, the fuel adhering to the cylinder liners 14 is easily vaporized sufficiently. This makes it easy to suppress the generation of PM.

Second Embodiment

Hereinafter, an engine according to a second embodiment will be described with reference to the drawings. Description of configurations common to the engines 100 according to the first and second embodiments will be omitted.

Figure 4:
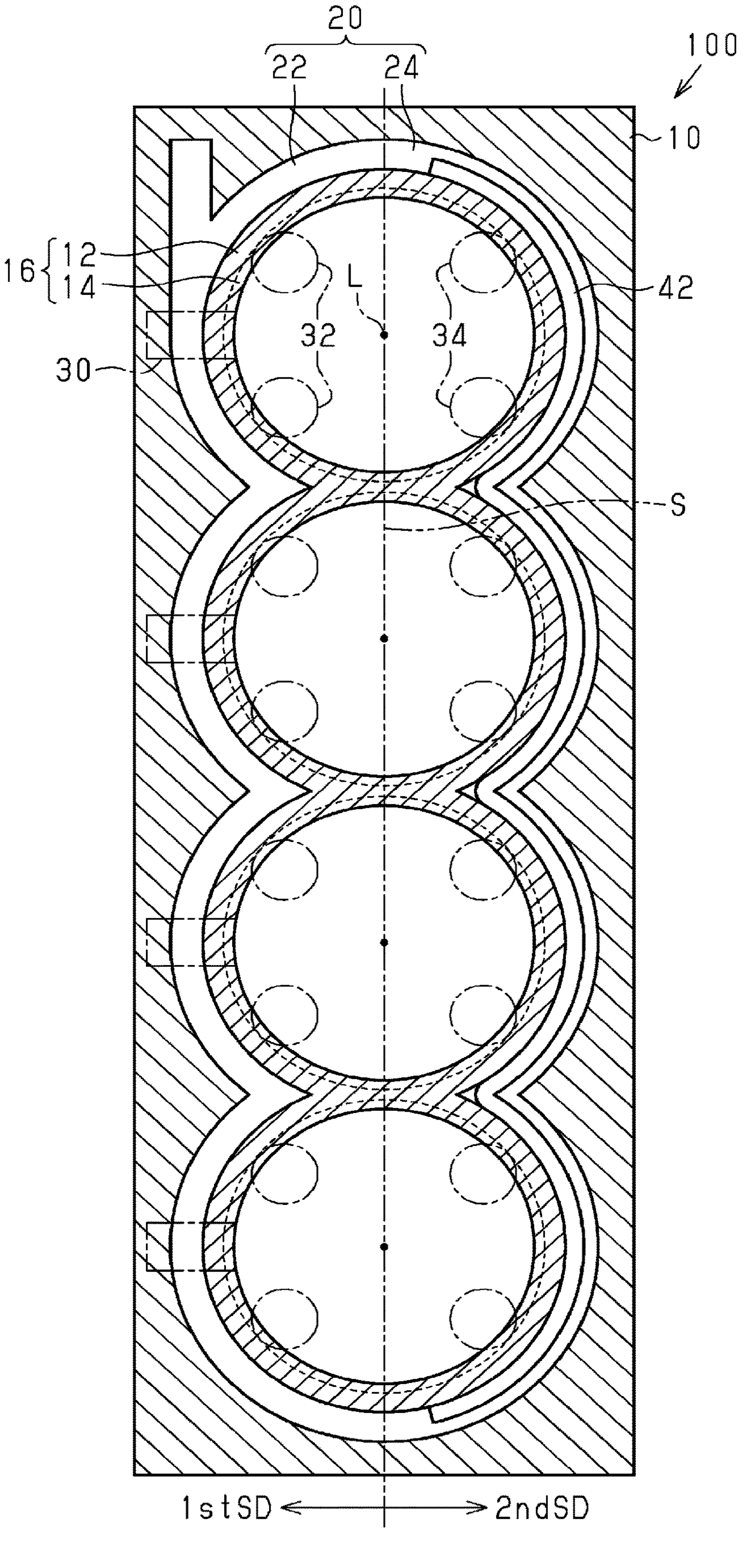
FIG. 4 is a cross-sectional view of a cylinder block provided in an engine according to a second embodiment.

In the engine 100 according to the first embodiment shown in FIG. 1, the cylinder liners 14 are entirely made of an iron material. The cylinder block 10 is made of an aluminum material except for the cylinder liners 14. In contrast, in the engine 100 according to the second embodiment shown in FIG. 4, the cylinder walls 12 and the cylinder liners 14 are entirely made of an iron material. The cylinder block 10 is made of an aluminum material except for the cylinder walls 12 and the cylinder liners 14.

<Advantages of Second Embodiment>

According to the engine 100 of the second embodiment, the following advantages are obtained in addition to the advantages described in (1-1) to (1-5) above.

(2-1) It is generally known that the cylinder block 10 is made of an aluminum material for the purpose of weight reduction. Further, it is generally known that the cylinder liner 14 is made of an iron material for the purpose of ensuring durability.

In the second embodiment, the cylinder walls 12 and the cylinder liners 14 are entirely made of an iron material, whereas the cylinder block 10 is made of an aluminum material except for the cylinder walls 12 and the cylinder liners 14. In contrast to the second embodiment, in the first embodiment the cylinder walls 12 are made of an aluminum material.

The induction coil 42 may apply an alternating magnetic field having a given frequency to the cylinder walls 12. The magnitude of the eddy current flowing through the cylinder walls 12 made of an aluminum material is the same as the magnitude of the eddy current flowing through the cylinder walls 12 made of an iron material. The magnitude of the eddy current increases in direct proportion to the frequency of the alternating magnetic field.

The volume resistivity of the iron material is about four times the volume resistivity of the aluminum material. Therefore, in order to generate the same level of Joule heat as in the second embodiment, it is necessary to increase the frequency by about four times in the first embodiment. In the second embodiment, the cylinder walls 12 can be inductively heated by passing an alternating current of a relatively low frequency through the induction coil 42. Therefore, according to the second embodiment, the heater 40 that generates a high-frequency alternating current and is expensive is not necessary. Therefore, according to the second embodiment, the costs required for the heater 40 are reduced.

(2-2) The aluminum material is a non-magnetic material. Therefore, in the first embodiment, in order to inductively heat the cylinder walls 12, it is necessary to supply a high-frequency alternating current to the induction coil 42. In the second embodiment, the cylinder walls 12 are made of an iron material which is a magnetic body. Therefore, the cylinder walls 12 are inductively heated by supplying an alternating current of a relatively low frequency to the induction coil 42. Therefore, according to the second embodiment, the heater 40 that generates a high-frequency alternating current and is expensive is not necessary. Therefore, according to the second embodiment, the costs required for the heater 40 are reduced.

(2-3) In general, as the frequency of the alternating magnetic field increases, the eddy current flows in a region closer to the surface of the object to which the alternating magnetic field is applied. This is commonly referred to as the skin effect.

The induction coil 42, the cylinder walls 12, and the cylinder liners 14 are arranged in this order. As described above, it is desirable to heat the cylinder liners 14 so that the fuel adhering to the cylinder liners 14 is sufficiently vaporized. Therefore, an increase in the frequency of the alternating magnetic field means that a portion more distant from the cylinder liners 14, which are desired to be heated, is easily heated. This means that it becomes difficult to heat the cylinder liners 14. According to the second embodiment, the frequency of the alternating magnetic field can be set to a low level. Therefore, according to the second embodiment, it is possible to reduce the influence of the skin effect. This means that the cylinder liners 14 can be easily heated.

Modifications

Elements that can be changed in common to the first and second embodiments are as follows. The following modifications can be implemented in combination with each other as long as there is no technical contradiction.

The entire cylinder block 10 may be made of an iron material.

In the first and second embodiments, the induction coil 42 is provided only in the second flow path 24. In addition to or instead of this, an induction coil different from the induction coil 42 may be provided in the first flow path 22.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An engine, comprising:

a cylinder block including a cylinder wall, a cylinder liner located inside the cylinder wall and continuous with the cylinder wall, and a water jacket extending along the cylinder wall; and a heater including an induction coil, the induction coil being disposed in the water jacket and extending along the cylinder wall, wherein the heater is configured to heat the cylinder wall by generating an eddy current in the cylinder wall by an alternating current flowing through the induction coil.

2. The engine according to claim 1, wherein the cylinder wall and the cylinder liner are entirely made of an iron material, and the cylinder block is made of an aluminum material except for the cylinder wall and the cylinder liner.

3. The engine according to claim 1, wherein the cylinder wall and the cylinder liner constitute a cylinder, and the cylinder is one of cylinders included in the cylinder block, the cylinders are arranged in a single row so that central axes of the cylinders are on one cross section of the cylinder block, the water jacket includes a first flow path located on a first side with respect to the cross section and a second flow path located on a second side with respect to the cross section, the first side and the second side being opposite to each other with respect to the cross section, each of the first flow path and the second flow path extends over the cylinders, and the induction coil is disposed in the second flow path.

4. The engine according to claim 3, further comprising injectors configured to inject fuel into the cylinders, respectively, wherein the injectors are directed toward the second side.

* * * * *